United States Patent [19]

Kwater

[11] 4,269,372
[45] May 26, 1981

[54] APPARATUS FOR CUTTING VEGETATION

[75] Inventor: James L. Kwater, Birmingham, Ala.

[73] Assignee: Emerson Electric Co., St. Louis, Mo.

[21] Appl. No.: 67,585

[22] Filed: Aug. 17, 1979

Related U.S. Application Data

[62] Division of Ser. No. 934,226, Aug. 15, 1978, Pat. No. 4,189,833.

[51] Int. Cl.$^3$ ............................................. B65H 59/00
[52] U.S. Cl. ............................ 242/129.8; 242/156.1; 242/172
[58] Field of Search .................. 30/276, 347; 56/12.7; 242/129.8, 156.1, 172

[56] References Cited

U.S. PATENT DOCUMENTS

| | | | |
|---|---|---|---|
| 3,463,416 | 8/1969 | Quenot | 242/156.1 X |
| 4,183,138 | 1/1980 | Mitchell | 30/276 |
| 4,189,833 | 2/1980 | Kwater | 30/276 |
| 4,202,094 | 5/1980 | Kalmar | 30/276 |

FOREIGN PATENT DOCUMENTS 6938265 10/1969 Fed. Rep. of Germany ............ 56/12.7

Primary Examiner—Jimmy C. Peters

[57] ABSTRACT

Apparatus for cutting vegetation with a rotating head having a ball member portion and carrying non-metallic cutting line extended into the cutting plane by pushing the ball member against the ground while rotating the head. The ball member portion moves inwardly and a spool carrying coiled cutting line forces a predetermined length of line out of the head. After the cutting line length is extended, the head is secured automatically to the spool for further rotation with the driven spool. A cover is releasably secured to the head by a twist-lock connection to allow the spool to be removed from the head for rewinding, etc. Movement of the spool with respect to the head is regulated by uniform interlocking, straight teeth that are rugged, long wearing and provide positive control without any possibility of "free wheeling" with respect to the spool and the head.

7 Claims, 10 Drawing Figures

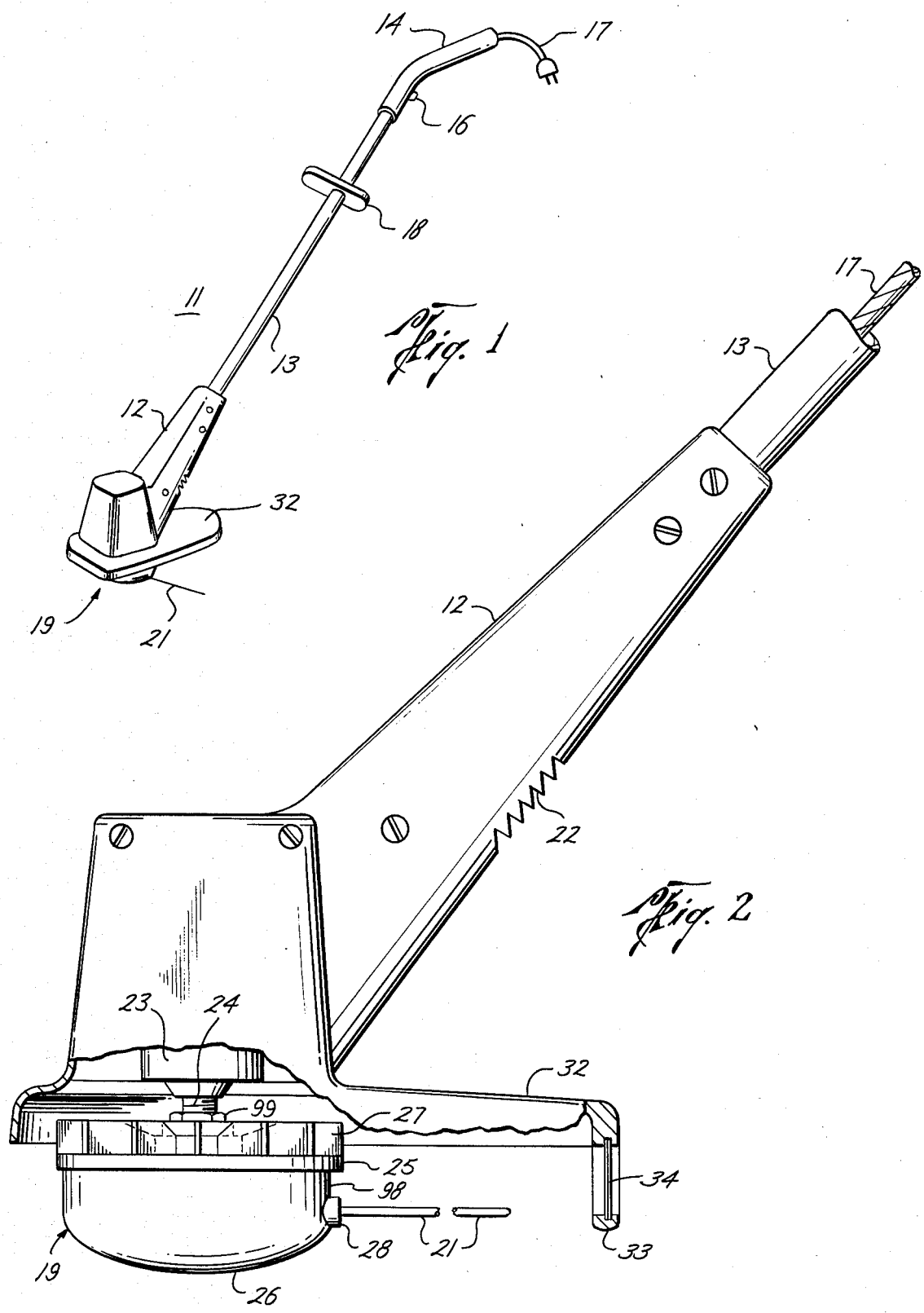

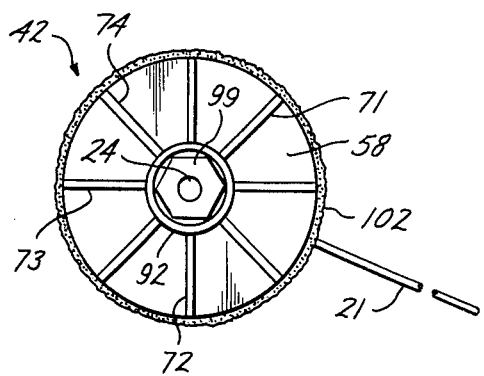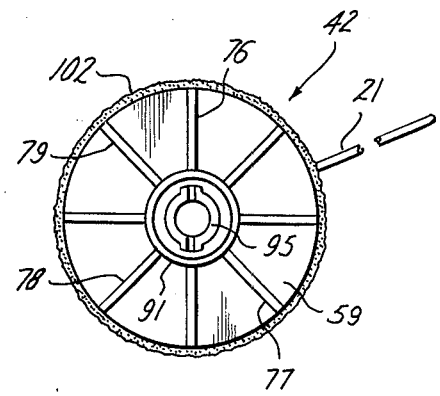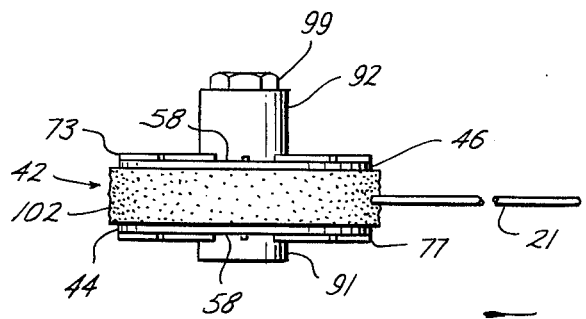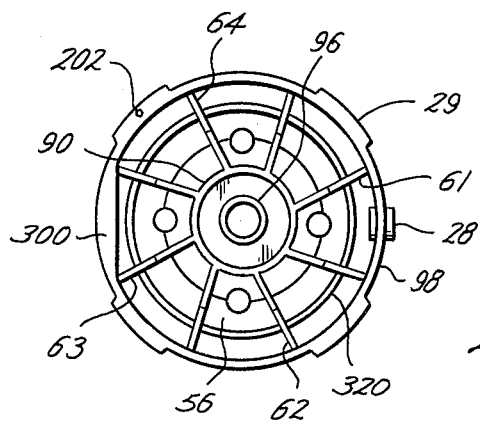

APPARATUS FOR CUTTING VEGETATION

This is a division of application Ser. No. 934,226, filed Aug. 15, 1978, and now U.S. Pat. No. 4,189,833 which issued Feb. 26, 1980.

BACKGROUND OF THE INVENTION

1. Field of the Invention

This invention relates to the cutting of vegetation and more particularly, it relates to the cutting of vegetation using a flexible, non-metallic cutting line extending from a rotating head into a cutting plane.

2. Description of the Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, 3,859,776, 4,035,912, 4,052,789, 4,054,992 and 4,067,108. These patented devices have met outstanding success in that these American developments are probably the safest electrical or gasoline-powered tools yet invented for vegetation cutting, edging and trimming operations.

The devices shown in these patents employ a flexible cutting line, such as manufactured from Nylon polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by d.c. electric motors, a system to extend the cutting line from the head without interrupting cutting operations was desired.

One attempt to solve the above problem has been set forth in Belgian Patent No. 852,150, and wherein there is provided a spool movable upwardly during vegetation cutting by contact with the ground of a ball member connected to the spool. Upward movement of the spool frees the spool from its rotational movement with the head member and centrifugal force pulls a predetermined length of fresh cutting line from the spool for extension into the cutting plane. After the feeding operation, the spool moves downwardly and is again locked to the head member for rotation therewith.

The device of the Belgian patent, while providing a vegetation cutter that will replenish new line during a cutting operation, nevertheless relies upon centrifugal force to feed the line which force is at best unreliable.

The present invention is a device for cutting vegetation in the nature of the above patented devices, wherein a durable and reliable, positive clutch-like mechanism is employed for extending selectively, the cutting line in a certain length from the head. More particularly, this novel apparatus is easy to operate, rugged in construction and has no complicated mechanisms. A ball portion on the head is depressed while the head is rotating. The line is forced from an internal spool which is rotated at a predetermined speed and therefore the spool is under positive control before, during and after the cutting line is extended. Other unique features of the present invention will be apparent from the following description.

SUMMARY OF THE INVENTION

In accordance with this invention, there is provided an apparatus for cutting vegetation which has a spool rotatable about an axis of rotation. The spool carries upper and lower planar clutch surfaces. A head is carried on the spool and journaled for rotation about the rotational axis and adapted to move axially against a biasing means from a first station to a second station. The head has upper and lower planar clutch surfaces. A flexible, non-metallic cutting line is coiled about the spool and has a free end extending outwardly of the head into a cutting plane. A ball member portion is mounted for axial movement and extends axially from the head. A plurality of uniform, radial, and angularly spaced straight teeth are carried on the clutch surfaces of the spool. The teeth on the clutch surfaces are not radial but are directed in a fashion to be tangents to a circle of a diameter equal to the width of the teeth on the spool. The teeth provide selective rotation of the head in a predetermined angular displacement about the spool in response to the ball member moving the head between the first and second stations. Positive rotation of the spool force feeds a certain predetermined length of cutting line through the head into the cutting plane. Then, the head is secured again positively for rotation with the spool.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 6 is a top view of the spool of FIG. 3 and including the foam band assembly;

FIG. 7 is a bottom view of the spool of FIG. 3 and including the foam band assembly;

FIG. 8 is a side view of the spool-band assembly of FIGS. 3, 6 and 7;

FIG. 9 is a top view of the head member of the rotatable assembly shown and depicted in FIGS. 2 and 3.

DESCRIPTION OF SPECIFIC EMBODIMENTS

Figure 3:
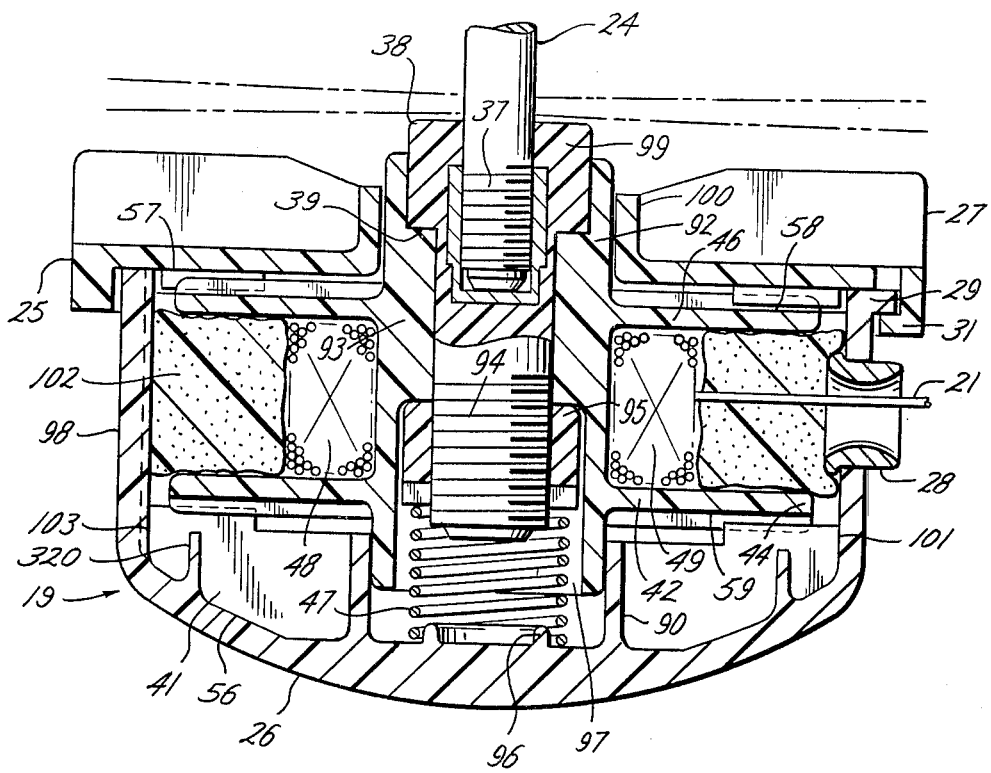
FIG. 3 is a vertical section, in enlargement, taken through the cutting head of the apparatus shown in FIG. 2.
Figure 4:
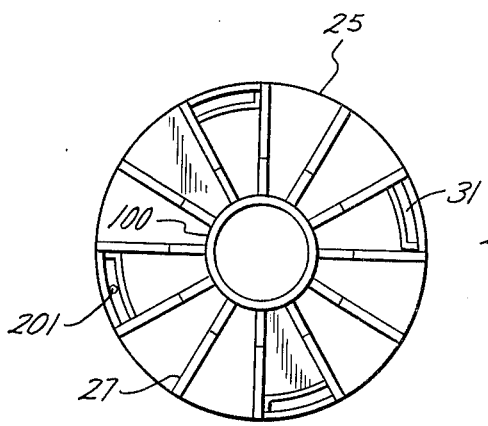
FIG. 4 is a top view of the upper cover member of the rotatable head assembly shown and depicted in FIG. 3.

Referring to FIG. 1 there is shown an apparatus for cutting vegetation, which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12 and extends the cutting line 21 into a cutting plane which is substantially perpendicular to the axis of rotation of the head.

In FIG. 2, there is shown an enlargement of the housing 12 carrying a plurality of air induction openings 22. These openings introduce a flow of cooling air over the prime mover contained in the housing 12. The housing 12 includes an electric motor 23 which has a downwardly-extending drive shaft 24. The head 19 is threadedly connected to the shaft 24 by an integral adapter 99. The upper surface of the head 19 may be surrounded by a plurality of vanes 27 serving as a centrifugal blower for moving air radially outwardly from the head 19 during its rotation. As a result, the induced flow of air cools the motor 23 within the housing 12. The head 19 includes a cover 25 and a cylindrical hub portion 98 which includes a curved bump surface 26. The hub 98 carries in its side peripheral surface an aperture through which the cutting line 21 extends radially outwardly into the cutting plane. A metal bearing or grommet 28 encircles the aperture and protects the line 21 against undue wear and breakages. The cover 25 is releasably secured to the hub 98. A twist-lock interconnection may be used which includes a lug 29 on the hub and a "L" notch 31 on the cover.

The housing 12 includes a rearwardly-extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly-extending projection 33 in which is embedded a metal cutting blade 34. As a result, the cutting line 21 rotated in a cutting plane by the head 19 can never have an operating length greater than the distance from the axis of rotation to the cutting blade 34. Any greater length of cutting line is automatically severed by the blade 34.

The head 19 as seen in FIG. 3, has a smooth peripheral side surface 98 carrying the grommet 28 through which the cutting line 21 extends into the cutting plane. If more than one cutting line is used, each line should have a separate aperture and bearing surface. The assembly carries integrally an adapter 99 in which the drive shaft 24 is secured by threads 37. In addition, the adapter 99 extends axially a sufficient dimension in the head 19 to form a rigid and integral connection with the shaft 24. Preferably, the adapter 99 is cylindrical with its upper terminus 38 having a flat circular shoulder 39.

The hub 98 forms a cylindrical cavity in cooperation with a cylindrical cover 25. A spool 42 is disposed within the cavity 41. Preferably the spool 42 is integral with the adapter 99. The cover 25 and hub 98 are mounted for independent rotation about the rotational axis and also axial movement about the spool 42. For this purpose, the spool has spaced-apart planar flanges 44 and 46, and a central axial opening 97 to receive spring member 47. The flanges 44 and 46 have circular peripheries and define a line storage area 48.

The central portion of the curved surface 26 of hub 98 includes an upstanding boss member 96 which anchors one end of the spring biasing means 47. The other end of the spring 47 extends upwardly within opening 97 and bears against a locking nut 95 secured to the lower end of adapter 99 by screw-threads 94.

In addition to the flanges 44 and 46 of spool 42, the spool includes a central core portion 93 which has a first upwardly extending bearing surface 92 and a second downwardly extending bearing surface 91. Surface 91 cooperates with lower guide means 90 on surface 26 of hub 98, while surface 92 cooperates with upper guide surface 100 on cover 25. Since the spool 42 is directly connected to the drive shaft 24 via adapter 99, the spool 42 will rotate directly with and at the same speed of rotation that motor 23 drives shaft 24. Cover 25 and hub portion 98 including curved surface 26 however, are not in direct drive connection to shaft 24 but by virtue of cooperating surfaces 92, 100 and 90, 91, may free-wheel with respect to both the spool 42 and adapter assembly 99. The bias of the spring 47 provides for the up and down movement of the cover 25 and hub 98 with respect to spool 42 as will be explained hereinafter.

The spool 42 is wound with cutting line 21 contained in several layers 49 between the flanges 44 and 46. The inner end of line 21 (not shown) is secured to the core portion 93 of the spool 42 and the free traveling end 21 of the line extends outwardly of spool 42 and into the cutting plane through grommet 28. Preferably, the line 21 is wound upon spool 42 in the same direction of rotation of the head 19 during vegetation cutting and for reasons explained hereinafter. In any event and by virtue of winding line 21 in the same rotational direction as head 19, centrifugal force during operation will tend to cause the coils of line 49 on spool 42 to unwind from the core portion 93 and accordingly to move away from core portion 93 towards the inner surface 101 of hub 98. In order to prevent this coil unwinding and to maintain the coils 49 tightly about core portion 93, annular sponge belly-band 102 is interposed between coils 49 and wall 101. Band 102 is preferably of an open or closed urethane foam material and including 40 micron pores. The particular construction of the band 102 is not critical provided, however, that it is both flexible, compressible, and adaptable to resume its original shape after being compressed. The band 102 is easily removed and replaced on spool 42 when the unit disassembled (see FIG. 10, for example) and may be arranged free of connection to either coils 49 or wall 101. In some instances, ribs 103 may be included on wall 101 to cause band 102 to move along with hub 98 or in place of ribs 103 band 102 may be glued or otherwise fixed to wall 101. As should be apparent from FIG. 3, line 21 passes from coils 49, through band 102 and into the cutting plane.

The exposed surfaces of the head 19, and especially the ball member 26, extend axially from the cover 25 in smooth surfaced contour rounded at the edges and without substantial projections and recesses capable of trapping appreciable vegetation. Preferably, the exposed surface of the ball member 26 is circular with rounded corners and coaxially aligned with the axis of rotation of the head 19. Also, the ball member 26 closely fits into the central opening in the cover 25. As noted above, a spring 47 is seated against the shoulder 96 and the lock nut 95. Thusly, the hub 98 and cover 25 in normal operation are biased into an outward or first station position. The ball member 26 can also move axially into an inward or second station position.

The cover 25 fits loosely in a telescoped relationship over the cylindrical spool surface 92. The looseness in fit of these parts can increase appreciably during repeated line extensions from the head 19. However, these telescoping elements do not need any special close tolerences in axial or angular bearing functions in the present head. Close bearing tolerences are not required by the unique and rugged mechanisms for locking the spool to the head and for selectively releasing the head to undergo a certain angular displacement required for a predetermined line extension from the spool.

The ball member 26 and cover 25 together move axially along the rotational axis as a unit from the outward station to the inward station when cutting line 21 is extended by rotation of the spool 42 relative to the hub 98. For this purpose, it is preferred to have the head 19 rotating at operative speeds and press the ball member 26 against the ground to move the ball member to its inward position. The spool 42 continues to rotate relative to the hub 98 and forceably extends cutting line 21 into the cutting plane. Locking elements for this function have a unique form (1) that secures the spool 42 to the hub 98 when the ball member is in the outward station; (2) when the ball member is moved to the inward station, that release the spool to rotate within the hub at a higher speed and through a predetermined angular displacement for forceably extending a certain length of cutting line from the head into the cutting plane, and then; (3) secures the spool again for further rotation with the hub. This functioning is obtained reliably even though the cover 25 and hub 98 may be relatively loose while rotating and moving axially about spool 42. The novel locking elements resemble the positive clutch mechanism of the straight toothed type which interlocks with long straight extending teeth surfaces of uniform height in compression for great strength and ruggedness.

The hub 98 and cover 25 have planar clutch surfaces 56 and 57, respectively normal to the rotational axis. Also, the spool 42 has planar clutch surfaces 58 and 59 upon the flanges 44 and 46, respectively, normal to the rotational axis. Thus, clutch surfaces 56 and 58 and 57 and 59 face one another in parallel relationship. A plurality of uniform and angularly spaced straight teeth of uniform height are carried on these clutch surfaces. Further, these teeth overlap axially when the hub 98 and cover 25 are moved axially between the first and second stations. Also, these teeth are offset angularly so that the spool 42 rotates relative to the head 19 when the head is moved from the first station to the second station.

Figure 5:
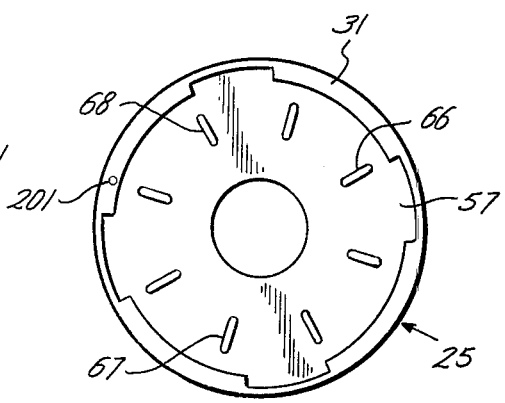
FIG. 5 is a bottom view of the upper cover member of the rotatable head assembly shown and depicted in FIG. 3.

A plurality of straight teeth forming a preferred arrangement are shown in FIGS. 5 and 9. For example, the clutch surface 56 carries eight uniform and angularly offset spaced lower teeth of which teeth 61-64 are shown. The clutch surface 57 carries an upper group of similar eight teeth of which teeth 66-68 are shown. However, the teeth 66-68 are angularly offset one-half the tooth spacing between the teeth 61-64.

The clutch surfaces 58 and 59 on the spool 42 each carry eight similar uniform and angularly spaced teeth of which teeth 71-74 and 76-79 are shown, in FIGS. 6-7, respectively. The teeth on both clutch surfaces 58 and 59 are axially and radially aligned. However, the teeth on clutch surfaces 56 and 57 do not extend radially through the axis of the shaft but are offset and are directed along a tangent to a circle drawn about the axis and having a diameter equal to the width of one of the teeth on clutch surfaces 58 and 59. This should be apparent from viewing FIG. 9. It will be noted that none of the teeth 61-64 extend directly along a line drawn through the axis. These teeth, as noted above, are rather along a line tangent to a circle the diameter of which is equal to the width of teeth 76-79 on surface 59 of spool 42. This offset relationship of teeth 61-64 and 66-68 is necessary in order for the mating sets of teeth, that is teeth 71-74/66-68 and 76-79/61-64 to fully abut one another along their length when in engagement. If it were not for offset teeth 61-64 and 66-68, the mating pairs of teeth would engage one another at angles one to the other rather than in the abutting relationship set forth above.

With the ball member 26 at the outward station, the spool has teeth 71-74 engaging the teeth 66-68 on the clutch surface 57 of the cover 25. Also, the spool teeth 76-79 are spaced axially a small distance from the teeth 61-64 on the clutch surfaces 56 of the hub 98.

With the trimmer 11 pressed against the ground during operation, the ball member 26 moves upwardly into the inward station and the spool teeth 76-79 move angularly into abutment with the teeth 61-64 of the hub 98 after the spool has rotated the certain angular displacement or offset between the teeth 61-64 and 66-68. These teeth now secure the head against rotation relative to the spool. Raising the trimmer 11 causes the head to be moved axially to its outward station and about spool 52. Now, the teeth 71-74 engage the teeth 66-68 after the spool 42 has rotated again a prescribed angular displacement relative to the offset between the teeth 61-64 and 66-68. Thereby, a certain length of cutting line 21 has been forceably extended from the spool and then, the head is secured to the spool against further unintended rotation. The spool has been forceably rotated in the hub a predetermined angular displacement with the ball member moving from the outward station to the inward station, and back again to the outward station. As a result, a certain length of cutting line 21 has been unwound from the directly rotated spool 42 and extended from the head 19.

The straight teeth carried on the clutch surfaces should be uniform in height although the height may not be identical for all groups of teeth 61-64, 66-68, 71-74, and 76-79. It is preferred that the teeth have a height or axial dimension such that adjacent teeth remain axially overlapped when the hub 98 is between the first and second station. In this arrangement, a very loose fitting cover 25 and hub 98 cannot free wheel around the spool during extension of cutting line.

Best results are obtained when all the teeth of each set are substantially identical in size and shape (both angular and axial and radial directed dimensions). Preferably, each set of teeth have abutting side surfaces which are smooth and aligned in lines parallel one to the other. Also, these side surfaces between engaged teeth should be straight.

Other self aligning side surface shapes can be used, such as pentagons, polygons of triangles, hexagons, etc. Also, these side surfaces may be complementary intersected curves such as semicylindrical surfaces. The only requirement of these side surfaces is that they are complementary. However, these side surfaces may have straight portions along lines parallel to the rotational axis of the spool and head. Thus, the loose fit between the spool 42 and the hub 98 is not critical because of the unique locking elements provided by the self aligning clutch surface and specially-shaped, straight teeth. Stated in another manner, the "positive clutch" action of these locking elements provides a rugged and long lasting system to regulate forceable rotation of the spool 42 in the head 19. If eight uniformly spaced teeth are used on each clutch surface, the angular spacing between adjacent teeth is 45 degrees, and the offset between teeth is 22.5 degrees. The spacings between the teeth, for best results, gives line extensions of between one half and one and one half inches. Preferably, the cutting line 21 is extended about one inch when the spool 42 completes its predetermined forced rotation within the head 19. These stated line extension dimensions produce good working of the head 19 and allow excellent dimensional arrangements of the teeth upon the clutch surfaces.

The locking mechanism of the present apparatus may be activated by (1) stopping the rotation of the spool; (2) manually moving the ball member to the inward position; (3) pulling upon the cutting line; (4) releasing the ball member to allow the spool to complete its rotation while yet pulling upon the cutting line; and (5) releasing the ball member to allow the spool to complete its rotation while yet pulling upon the cutting line 21. Preferably, the operation is performed (with the electric motor 23 rotating the spool) by the operator pressing the ball member to its inward station against the ground. Then, the operator raises the head 19 slightly from the ground to remove contact of the ball member 26 with the earth's surface. Now, the ball member returns to its outward station. As a result, the extension of the cutting line 21 is completed very simply and automatically by the novel structure employed in the trimmer 11.

The cover 25 can be releasably secured to the hub 98 by any system. Preferably, a twist-lock arrangement is used. For this purpose, as shown in FIGS. 3, 5, and 9, the hub 98 carries one or more lugs 29. The interior surfaces of the cover 25 carries "L" shaped openings 31 to allow the lugs 29 axially to enter the cover as it is slipped about the hub 98. The cover 25 is rotated on the hub 98 so that the lugs 29 slide into the horizontal part of the "L" shaped notch 31 and secure the cover and hub into an integral assembly. Preferably, the cover rotates to lock the lugs into notch 31 counterdirectionally to the direction in which the head 19 rotates during operation. Thus, vibrations during head rotation cannot loosen the cover from the hub 98.

In order to secure the assembly together during shipment, there may be provided means for connecting the cover 25 and the hub 98 together. As seen in FIGS. 4, 5, 9, and 10, a cotter pin 200 may be inserted through aligned openings 201 and 202 in the cover 25 and hub 98 respectively. Prior to assembly of the unit 19 to the shaft 24 of the trimmer apparatus 11 of FIG. 1, cotter pin 200 should be removed as rotation of the unit will itself lock the cover and hub together as noted hereinabove.

Figure 10:
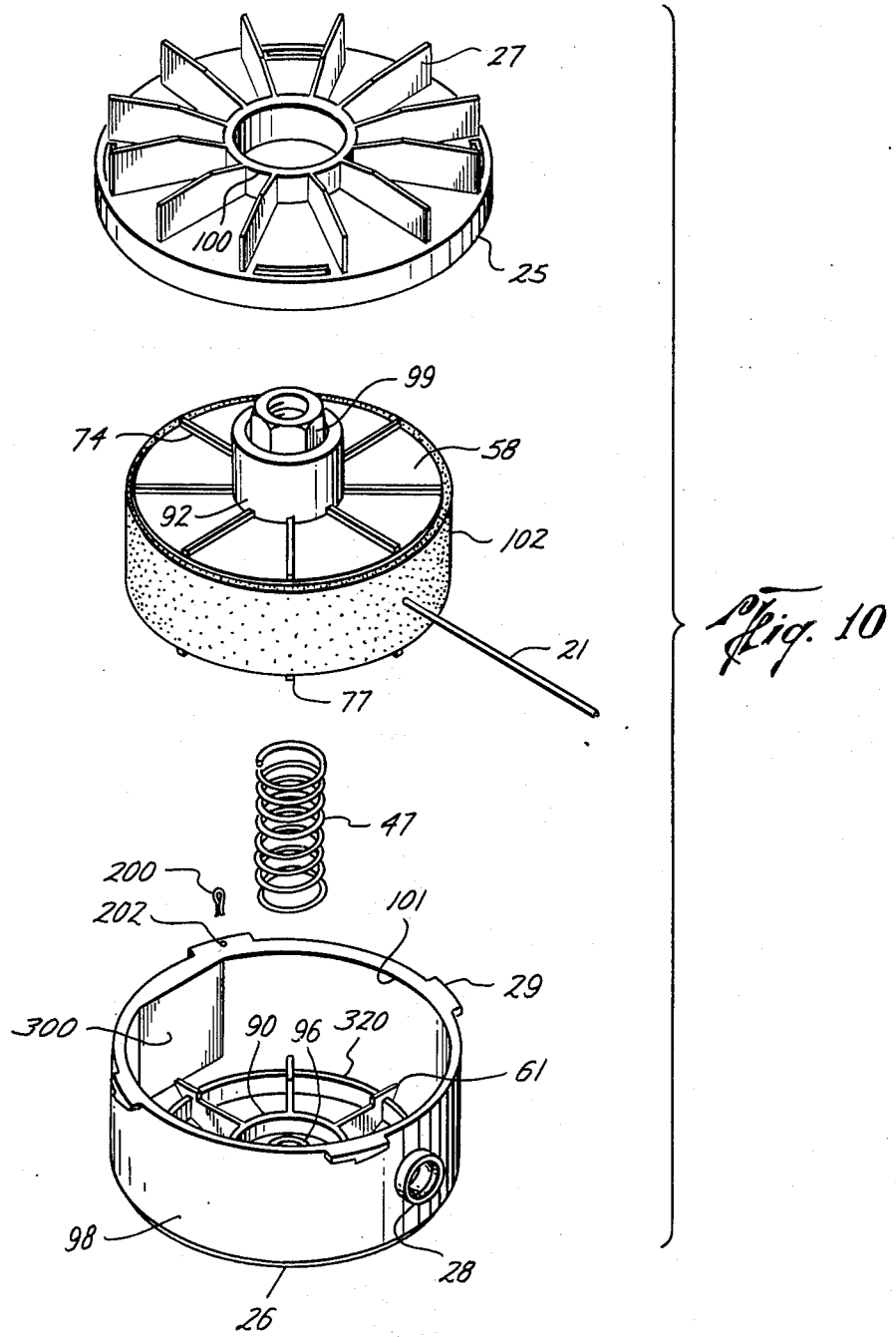
FIG. 10 is an isometric view of an exploded assembly drawing of the head and spool assembly and including the cover, the spool-band unit, the biasing spring means, and the lower head member.

With reference to FIGS. 9 and 10, a further feature of the present invention includes means whereby the head embodiment may be balanced rotationally so as not to transmit unwanted vibrations to the motor shaft 24. Thus, to provide a smooth running and rotationally balanced head assembly 19, it is necessary to offset the weight attributable to the grommet 28 and the line extending outwardly thereof. If, for example, a single cutting line passes outwardly of the periphery of head 98 via grommet 28, the mass of the grommet and the peripherally extending portion of the line will unbalance the head in a rotational sense. Thus, the head will include a mass that is not offset by a corresponding mass at a location diametrically opposite grommet 28. To overcome this deficiency, and with reference to FIG. 10, there will be seen balancing rib 300. The balancing rib is located diametrically opposite grommet 28. Thus, for example, balancing rib 300 balances line 21 and the grommet. When the head is assembled for grass cutting operation and includes therein a full spool of line, the line is inserted into grommet 28. The line extends outwardly of the grommet and acts as a flail to cut vegetation. Normally, a five to six inch length of line is used for cutting operations. However, as noted above, it is this grommet and section of line that causes head 98 to rotate in an otherwise unbalanced condition. It is therefore the function of the balancing rib 300 to offset this mass of the grommet and the five or six inch flail. This is accomplished by constructing the balancing rib of an amount of material equal in weight to the mass of the grommet and the extended flail section of line member 21. This weight of the balancing rib will vary from unit to unit depending, of course, upon variable factors such as line diameter, line density, length of the flail portion of the line, and the particular materials of construction. Sufficient to say, however, that the balancing rib 300 has a mass equal or substantially equal to the mass of the grommet and the extended cutting flail portion of line 21.

Although the head 19 in all its elements may be formed of metal, plastic or other material, it is preferred to use rather inexpensive polymeric materials which are readily fabricated by high-speed molding operations. The spool 42 can carry sufficient cutting line 21 (e.g., 0.065-0.100 inch in diameter Nylon polymer) for several years' vegetation cutting before requiring a new supply of cutting line. When desired, the cover 25 is readily removed from the hub 98 and the spool 42 rewound or replaced with another having a fresh supply of the cutting line 21.

As explained hereinbefore, the device of the present invention differs from the prior art structures in the feature of providing a positive and direct drive to the spool rather than to the surrounding head assembly as has been the case in the past. Thus, in FIG. 3, there is seen that spool 42 rotates at the same speed as shaft 24 because of its direct connection thereto via adapter 99. The sub-assembly of the head member 98 and cover 25 maintains more or less a floating relationship with respect to the spool 42 enabling the spool to actually force feed fresh line out of the head rather than to rely upon the action of centrifugal force in pulling the line from the spool. This spool forced feeding is accomplished by providing a speed differential between the spool and cover/hub unit, but with the spool being the controlling element in the system. In other words, when the member 26 contacts the ground to initiate a feeding operation, this very ground contact slows the rotation of the hub 98 while the spool goes right on rotating at the same speed as the motor shaft 24. Since spool 42 is turning at a higher rate than the hub 98, the spool 42 actually forces another increment of line 21 from the coils 49, through band 102, and out of the grommet in the wall of hub 98. The amount of line extended is, of course, controlled by the cooperation between the clutch surfaces noted above. When ground contact is removed, the hub 98 again returns for rotation at the same speed as spool 42. Since a substantial amount of stress is placed on hub 98 by the so-called "tap-and-go"

operation, it is desirable to strengthen hub 98 as much as possible and therefore an inner circular strengthening rib 320 is provided in the interior of curved portion 26 of hub 98. Further strength of the hub 98 is provided by the fact that teeth 61-64 are constructed in a fashion to be integral with both surface 26 and hub wall 101.

A further feature of the present invention may be seen with reference again to FIG. 3 wherein it will be seen that grommet 28 is constructed to be rather loosely fitted in wall 101 of hub 98. This provides the advantage that the grommet may be removed from the hub 98 and replaced by a new grommet, or that the grommet may be rotated in wall 101 to present new metal surfaces for support of line 21.

Another advantage of the present construction resides in the fact that the biasing means 47 in FIG. 3 is fully shielded along its length by cylindrical surfaces in order to prevent the spring 47 from wobbling in a sideways direction. Thus, surfaces 90 and 91 shield spring 47 in order that a more or less constant compression of less than ten pounds per inch may be maintained, and radial spring distortion avoided.

In addition to holding the coils 49 about core 93, belly-band 102 also functions as a safety feature in that in the event line 21 breaks off at the grommet 28, band 102 will hold line 21 and prevent it from retracting into hub 98. It is then merely necessary to stop motor 23, grab the broken end of the line held by band 102, and extend the line as outlined above whereupon the cutting operation may again be resumed. Along this line it is again noted that cutting line 21 is wound on spool 42 in the same direction of rotation of shaft 24. This is opposite to prior art devices wherein the cutting line is wound in a direction opposite the shaft rotation and wherein such winding actually tightens the coils on the core of the spool. By winding as in the present invention, this tightening effect is avoided and the line actually tends to unwind from the spool to forceably assist its ejection from the head assembly. Thus, the drag of the hub surface 26 on the ground provides the line feeding force whereas in prior devices the drag was of no positive benefit.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. As a subcombination,
   a spool-like member having a core portion and at least two spaced apart flange portions extending radially outwardly of the periphery thereof,
   a flexible non-metallic line member wound in coils about said core portion between said flange portions, and
   an annular band of a synthetic plastic foam located between said flange portions and having the inner surface of said band in contacting relationship to said coils.

2. The spool-like member of claim 1 wherein said flange portions each have a plurality of straight radial teeth of uniform width and height.

3. The spool-like member of claim 1 wherein said line member is wound in coils about said case portion in the direction of rotation of said spool-like member.

4. The spool-like member of claim 1 wherein said annular band is transversed by said line member with its free end ending outwardly of said annular band.

5. The spool like member of claim 4 wherein said annular band is urethane foam.

6. As a subcombination, a spool-like member having a core portion and at least two spaced apart flange portions extending radially outwardly of the periphery thereof,
   (a) said flange portions each have a plurality of straight radial teeth of uniform width and heighth;
   (b) a flexible non-metallic line member wound in coils about said core portion between said core portion between said flange portion,
   (c) said line member wound in coils about said core portion in the direction of rotation of said spool like member;
   (d) an annular band of synthetic plastic foam located between said flange portions and having the inner surface of said band in contacting relationship to said coils, and
   (e) said line member extending through said annular band with said line member having a free end exterior of said annular band.

7. The spool-like member of claim 6 wherein said annular band is urethane foam.

* * * * *